June 15, 1954  L. WELFL  2,680,922
FROG TRAP
Filed July 19, 1950  2 Sheets-Sheet 1

Lewis Welfl
INVENTOR.

BY *Clarence A. O'Brien*
*and Harvey B. Jacobson*
Attorneys

June 15, 1954  L. WELFL  2,680,922
FROG TRAP
Filed July 19, 1950  2 Sheets-Sheet 2
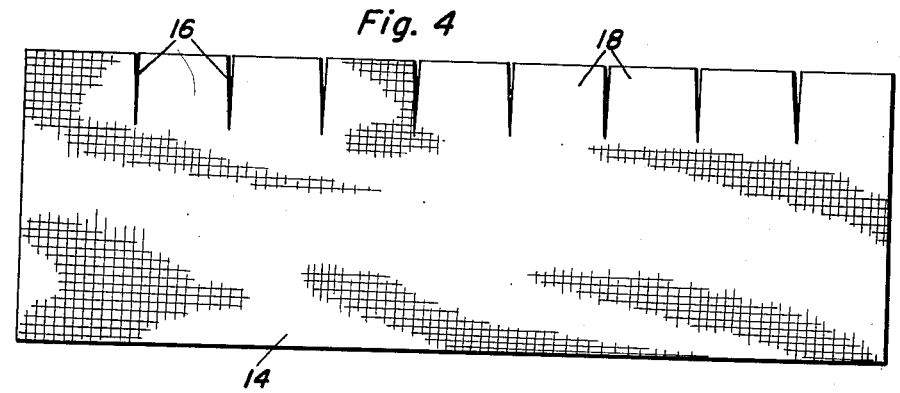
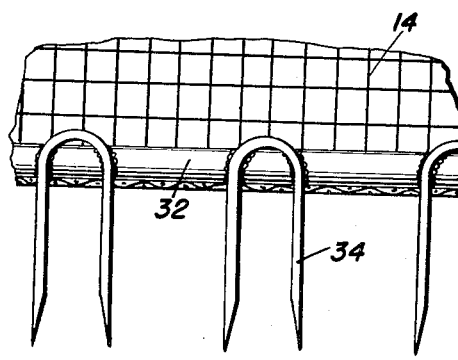
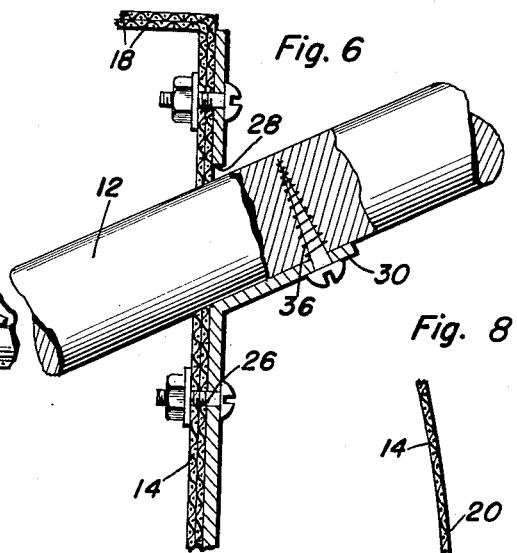
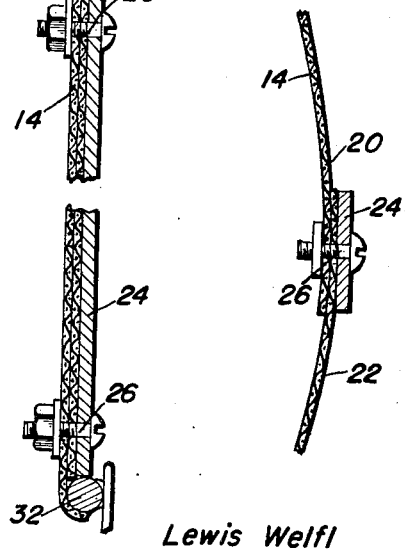
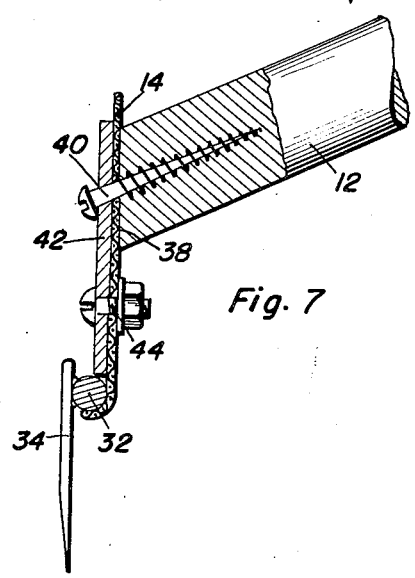
Lewis Welfl
INVENTOR.

Patented June 15, 1954

2,680,922

UNITED STATES PATENT OFFICE 2,680,922

FROG TRAP

Lewis Welfl, Belvidere, S. Dak.

Application July 19, 1950, Serial No. 174,715

4 Claims. (Cl. 43—1)

This invention comprises novel and useful improvements in a frog trap and more specifically pertains to a basket-like implement specifically adapted for trapping frogs and the like.

A primary object of this invention is to provide an improved frog trap which shall be of light weight and inexpensive construction, easily manipulated and durable for the purposes intended, and highly efficient in use.

More specifically, it is an object to provide an improved frog trap having means for effectively encircling and trapping a frog together with means whereby the frog may be readily removed from the trap when desired.

These, together with various ancillary features and objects of the invention which will later become apparent as the following description proceeds, are attained by the present invention, a preferred embodiment of which has been illustrated by way of example only, in the accompanying drawings, wherein:

Figure 4 is a plan view of a sheet of foraminous or reticulated material from which the trap may be fabricated;

Figure 5 is a fragmentary elevational view of an enlarged detail of a portion of the bottom of the wall of the trap;

Figure 6 is a vertical transverse sectional view taken substantially upon the plane indicated by the section line 6—6 of Figure 2 and showing the manner in which the handle is attached to the trap;

Figure 7 is a vertical transverse sectional view taken substantially upon the plane indicated by the section line 7—7 of Figure 2 and illustrating the manner in which the end of the handle is attached to a trap; and, Figure 8 is a fragmentary horizontal sectional view taken substantially upon the plane indicated by the section line 8—8 of Figure 1.

Figure 1:
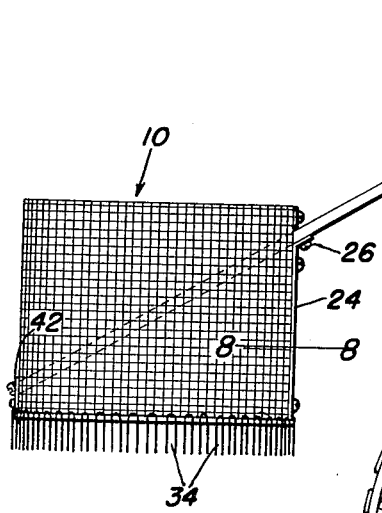
Figure 1 is a side elevational view of an embodiment for a trap incorporating therein the principles of this invention.

Referring now more specifically to the accompanying drawings, wherein like numerals designate similar parts throughout the various views, it will be seen that the improved frog trap forming the subject of this invention includes, as shown in Figure 1, a body portion 10 and a handle 12 which is attached thereto in a novel and improved manner.

As shown in Figure 4, the body 10 may conveniently consist of a single sheet of material, such a sheet being indicated at 14, and which is preferably of metal screening, hardware cloth or any other similar material. As shown, the sheet of material from which the body is formed is preferably of rectangular shape, and at its upper end is provided with a plurality of slots 16 which are disposed in parallel relation and in longitudinally spaced position throughout the length of the upper edge. These slots divide the upper portion of the sheet into a plurality of similar sections 18.

The body of the trap is formed preferably by disposing the ends of the sheet 14 in overlapping relation, as will be apparent from Figure 8, the end portions 20 and 22 being overlapped to form a vertically extending joint, and preferably a reinforcing plate 24 in the form of a metallic strip of elongated rectangular shape, or of any other desired material, is disposed upon this joint and secured thereto by suitable fastening means such as the nuts and bolts 26, as shown more clearly in Figure 6. At a convenient point adjacent the top of the strip 24, the latter is provided with a slot or opening 28 which is preferably formed by bending downwardly a tongue or struck out portion of the material of the strip as at 30, the member 30 forming a bracket which is integral with the strip and is upwardly and outwardly inclined with respect to the body.

At its lower end, the material 14 of the body 10 has secured thereto a reinforcing ring 32 which may conveniently consist of a heavy wire loop or the like, this ring having a plurality of prongs 34 in the forms of conventional heavy wire or metallic staples welded or otherwise secured thereto with the prongs in depending relation below the ring. Preferably, these prongs extend throughout the entire circumference of the ring in circumferentially spaced relation. The prongs 34 bite into the ground when the body of the trap is swung to ground engaging position for the purpose of trapping a frog or the like thereby preventing the body of the trap from slipping or skipping along the ground surface and, consequently, materially lessening the frog's chances of escape.

The handle 12 extends through the slot 28, and through a suitable aperture in the material 14 of the body, and resting upon the bracket 30 is secured thereto by a wood screw or the like as at 36, the handle preferably extending across the entire inside diameter of the body, and is shown in Figure 7 being suitably beveled as at 38 upon its extremity for an even engagement with the other side of the sheet 14, and is rigidly attached thereto as by means of a wood screw or the like 40 which extends through a vertically disposed reinforcing plate 42 likewise secured to the body as by fastening screw or bolt 44. The reinforcing plates 24 and 42 engage the rim 32 at their downward ends, thereby retaining the rim 32 in a fixed relation relative to the wall of material 14. Thus, when the trap is forcibly disposed against the ground, the stress is set up in the body and transmitted evenly to the handle between the connection of the end of the handle to plate 42 and the connection of the intermediate portion of the handle to the bracket 30. This serves three purposes. First, the vibrations set up in the handle are greatly diminished; second, bending of the bracket 30 is prevented; and third, the tendency of the body to skip along the ground is most effectively counteracted.

Figure 2:
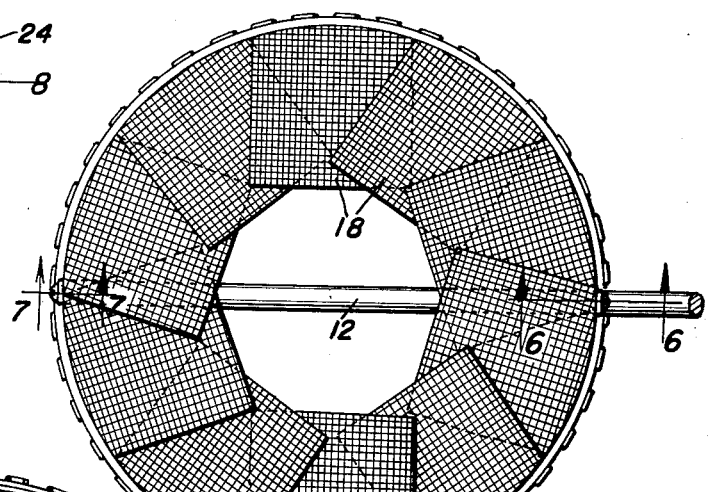
Figure 2 is a top plan view of the trap shown in Figure 1, a portion of the handle being broken away.
Figure 3:
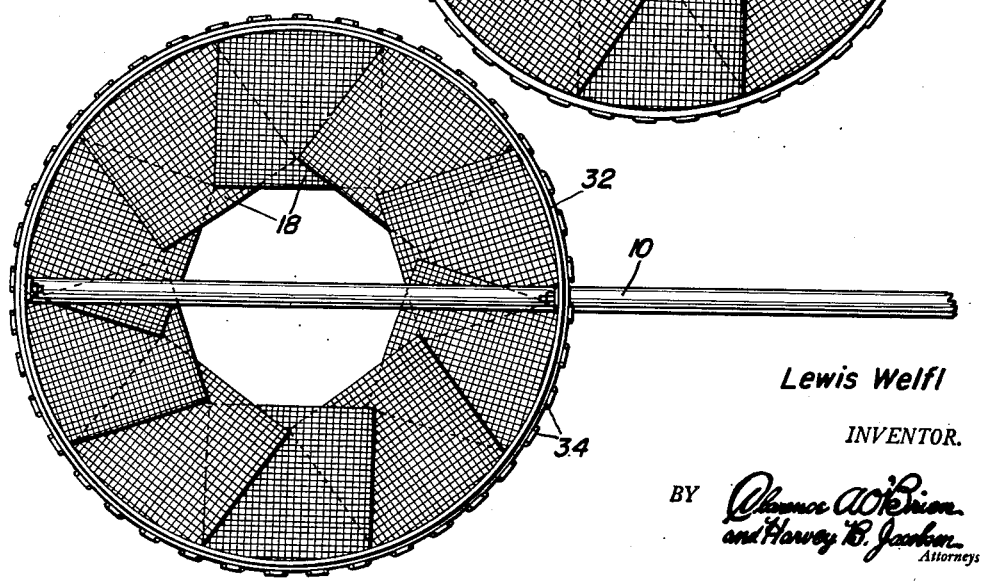
Figure 3 is a bottom plan view of the trap of Figure 1.

A partial closure for the top of the body is provided to prevent the frog entrapped therein from escaping. This enclosure is preferably formed of overlapping sheets of foraminous material, as by bending the panels or sections 18 into a horizontal position inwardly of the rim of the body as shown in Figures 2 and 3, thus providing a polygonal shaped aperture at the center of the top by means of which the hands of the user may be inserted to remove the frog trapped in the device.

From the foregoing, it is thought that the construction and advantages of the invention together with its operation will be readily understood and further explanation is thought to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A frog trap comprising a body having a tubular wall and being formed of foraminous material, one end of said wall being partially closed by means of a plurality of overlapping sheets of foraminous material which are integral with and are extensions of said wall, the other end of said wall having a reinforcing rim secured to its peripheral edge, rigid U-shaped prongs secured to and depending from said rim, a reinforcing plate secured to said wall and having a bracket thereon, a handle extending angularly through said wall and reinforcing plate and being secured to said bracket, and a second reinforcing plate secured to the wall diametrically opposite to the first reinforcing plate, the second reinforcing plate having securing means extending therethrough and into the handle, the lower edges of the reinforcing plates contacting said rim to maintain said rim in fixed relation relative to the wall.

2. A frog trap comprising a body having a tubular wall and being formed of foraminous material, one end of said body being partially closed by means of a plurality of overlapping sheets of foraminous material which are integral with and extensions of said wall, the other end of said wall having a reinforcing rim secured to its peripheral edge, rigid U-shaped prongs secured to and depending from said rim, a reinforcing plate secured to said wall and having a bracket thereon, a handle extending through said wall and reinforcing plate and secured to said bracket, a second reinforcing plate secured to the wall opposite to the first plate, said handle extending angularly through the body interior and having its end secured to said second reinforcing plate, said reinforcing plates engaging said rim to maintain the rim in fixed position on the tubular wall.

3. A frog trap comprising a tubular wall of foraminous material, a reinforcing rim at the lower end of said wall, first and second reinforcing plates secured to said wall diametrically opposite one another to stiffen said wall, said first plate having a bracket integral therewith and having an opening adjacent said bracket, a handle extending angularly through said first plate and abutting said second plate, fastening means securing said handle to said bracket and said second plate, and a plurality of pointed prongs secured to and depending from said reinforcing rim to penetrate the ground, said reinforcing plates engaging said rim to maintain the rim in fixed position on the tubular wall.

4. The combination of claim 3 wherein the upper end of said wall is partially closed by a plurality of overlapping sheets of foraminous material to provide a hand hole for removing frogs from the trap.

References Cited in the file of this patent

UNITED STATES PATENTS

| Number | Name | Date |
|---|---|---|
| 208,031 | Morse et al. | Sept. 17, 1878 |
| 404,585 | Wright | June 4, 1889 |
| 504,245 | Reagan | Aug. 29, 1893 |
| 600,550 | Newton | Mar. 15, 1898 |
| 995,886 | Means | June 20, 1911 |
| 1,007,758 | White | Nov. 7, 1911 |
| 1,346,021 | Harris | July 6, 1920 |
| 1,382,592 | Ames | June 21, 1921 |
| 1,606,568 | Gross | Nov. 9, 1926 |
| 1,626,530 | Harris | Apr. 26, 1927 |